(12) United States Patent
Sakai

(10) Patent No.: US 8,625,445 B2
(45) Date of Patent: Jan. 7, 2014

(54) COMMUNICATION APPARATUS AND CONTROL METHOD THEREFOR

(75) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 12/988,781

(22) PCT Filed: Mar. 27, 2009

(86) PCT No.: PCT/JP2009/001411
§ 371 (c)(1),
(2), (4) Date: Oct. 20, 2010

(87) PCT Pub. No.: WO2009/130850
PCT Pub. Date: Oct. 29, 2009

(65) Prior Publication Data
US 2011/0032918 A1 Feb. 10, 2011

(30) Foreign Application Priority Data
Apr. 24, 2008 (JP) ................ 2008-113901

(51) Int. Cl.
*H04W 84/18* (2009.01)
(52) U.S. Cl.
USPC .......................... 370/252; 370/338
(58) Field of Classification Search
None
See application file for complete search history.

(56) References Cited

U.S. PATENT DOCUMENTS

| 7,095,732 | B1 * | 8/2006 | Watson, Jr. .................. 370/346 |
| 2005/0111419 | A1 * | 5/2005 | Kwon et al. ................. 370/338 |
| 2006/0268744 | A1 | 11/2006 | Sakai et al. |
| 2008/0089300 | A1 | 4/2008 | Yee |
| 2008/0123558 | A1 * | 5/2008 | Chhabra ....................... 370/254 |
| 2009/0232082 | A1 * | 9/2009 | Bidichandani et al. ....... 370/329 |

FOREIGN PATENT DOCUMENTS

JP 2006-310996 A 11/2006

OTHER PUBLICATIONS

Wi-Fi Certified(TM) for Wi-Fi Protected Setup: "Easing the User Experience for Home and Small Office Wi-Fi(R) Networks", http://www.wi-fi.org/wp/wifi-protected-setup.
U.S. Appl. No. 13/124,203, filed Apr. 14, 2011, Fumihide Goto.
U.S. Appl. No. 13/122,619, filed Apr. 5, 2011, Fumihide Goto.
U.S. Appl. No. 13/122,558, filed Apr. 4, 2011, Tatsuhiko Sakai.
U.S. Appl. No. 13/120,535, filed Mar. 23, 2011, Fumihide Goto.
U.S. Appl. No. 13/061,124, filed Feb. 25, 2011, Tatsuhiko Sakai.
U.S. Appl. No. 12/996,484, filed Dec. 6, 2010, Fumihide Goto.
U.S. Appl. No. 12/989,070, filed Oct. 21, 2010, Tatsuhiko Sakai.
U.S. Appl. No. 13/140,814, filed Jun. 17, 2011, Tatsuhiko Sakai.
U.S. Appl. No. 12/748,771, filed Mar. 29, 2010, Masahiro Nagatani.
Japanese Office Action issued on Oct. 9, 2012 in corresponding application No. 2008-113901.

* cited by examiner

*Primary Examiner* — Min Jung
(74) *Attorney, Agent, or Firm* — Carter, DeLuca, Farrell & Schmidt LLP

(57) ABSTRACT

A communication apparatus decides whether to provide, to a receiving apparatus that receives provided communication parameters, communication parameters that have been set by a communication-parameter setting process performed with another communication apparatus. When it is determined to provide the set communication parameters, a parameter that controls sending of an informing signal is changed in order to increase the number of informing signals sent by the communication apparatus per unit time.

12 Claims, 7 Drawing Sheets

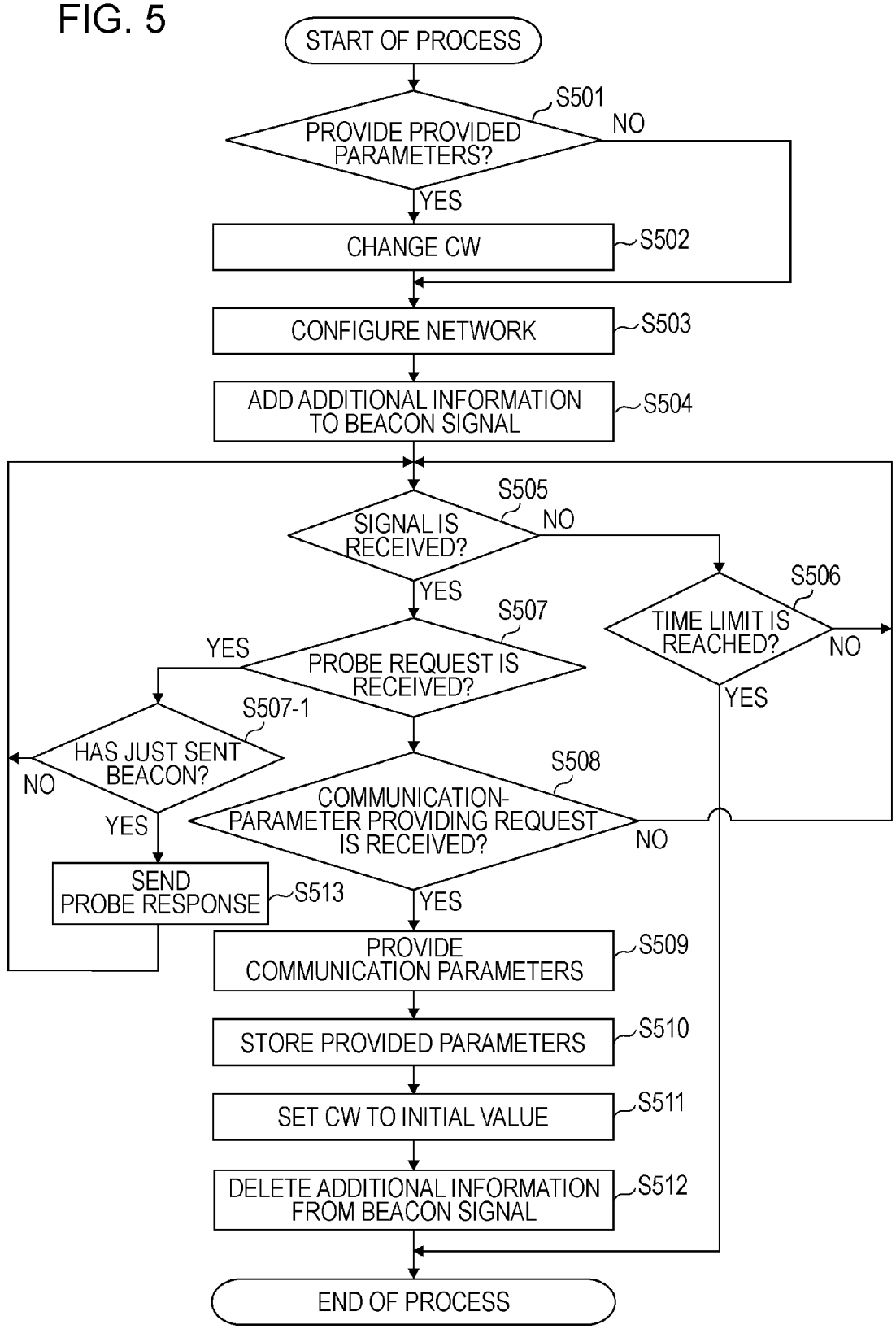

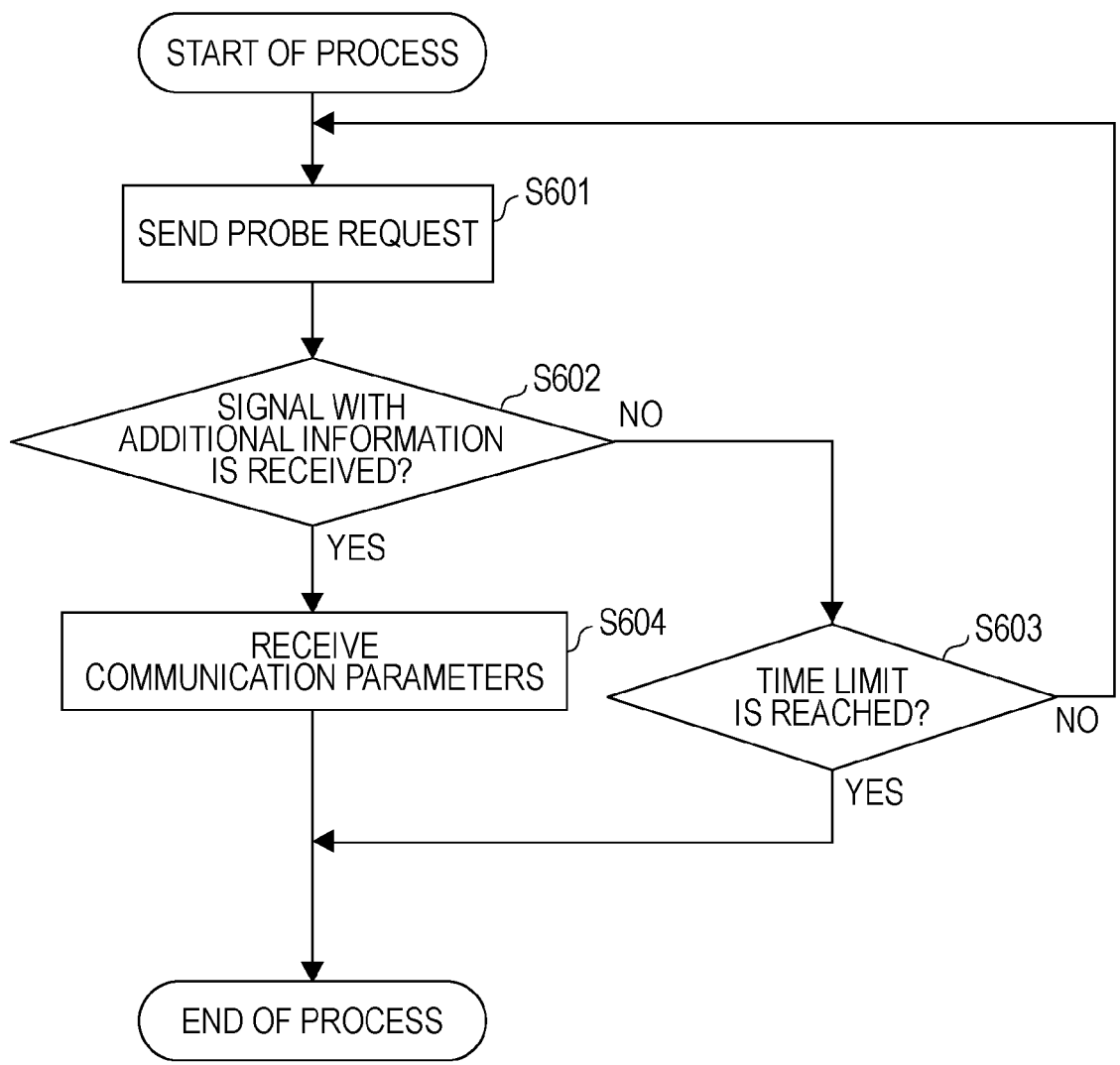

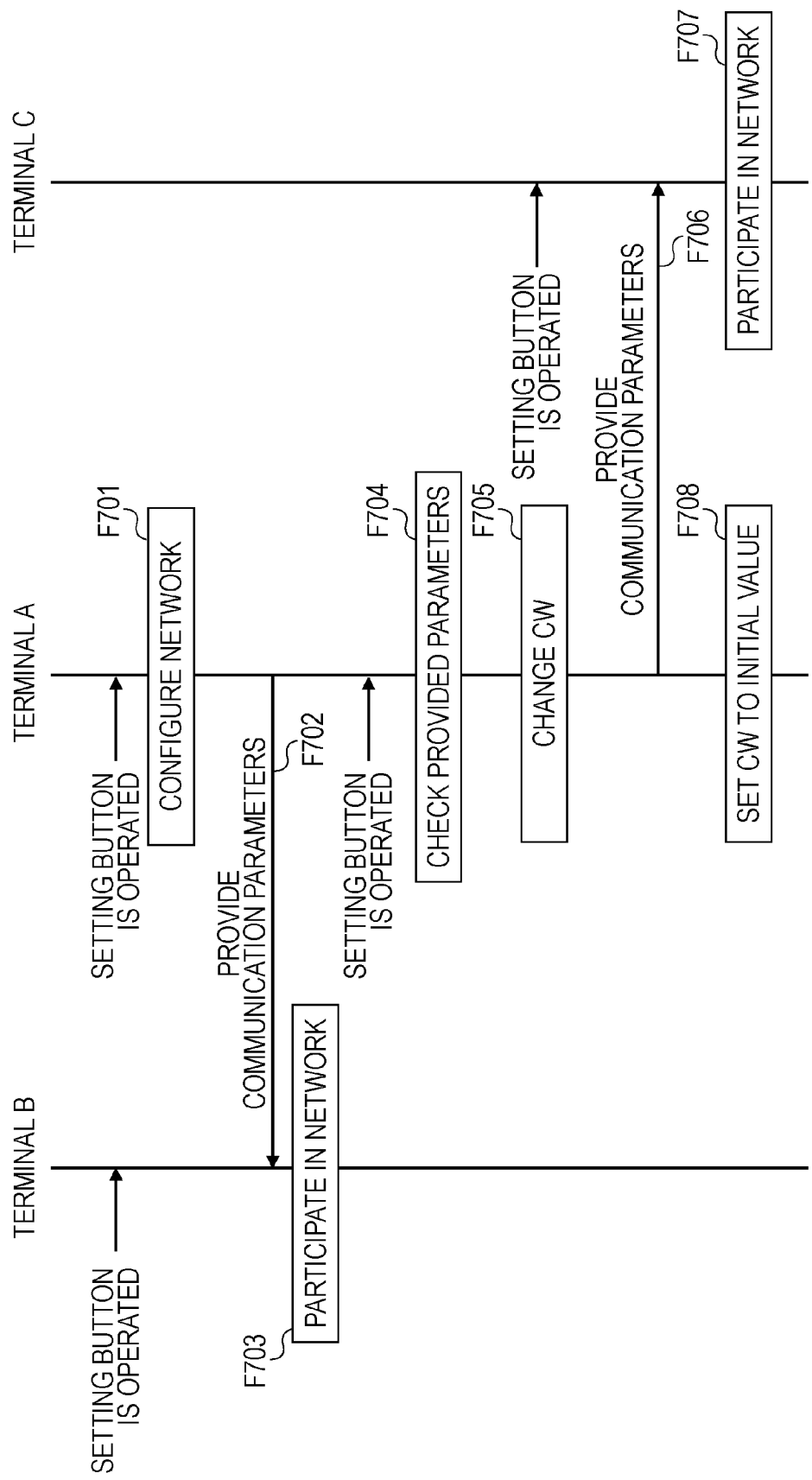

COMMUNICATION APPARATUS AND CONTROL METHOD THEREFOR

TECHNICAL FIELD

The present invention relates to communication apparatuses and control methods therefor.

BACKGROUND ART

In wireless communication represented by wireless local area networks (LANs) conforming to the Institute of Electrical and Electronics Engineers (IEEE) 802.11 standard series, there are many setting items that must be set prior to use.

For example, as setting items, there are communication parameters needed to perform wireless communication, such as the Service Set Identifier (SSID) which is a network identifier, an encryption method, an encryption key, an authentication method, and an authentication key. It is very complicated for the user of a wireless device to manually enter and set these communication parameters.

Therefore, various manufacturers have devised automatic setting methods for easily setting communication parameters in wireless devices.

In these automatic setting methods, one device (hereinafter called a providing apparatus) provides communication parameters to another device (hereinafter called a receiving apparatus) connected thereto, using a procedure and messages determined in advance between these connected devices, and accordingly the communication parameters are automatically set. Patent Citation 1 discloses an example of automatically setting communication parameters in wireless LAN ad-hoc mode communication (hereinafter called ad-hoc communication).

Also, Non Patent Citation 1 discloses an example of automatically setting communication parameters in wireless LAN infrastructure mode communication (hereinafter called infra-communication).

In the automatic setting method of Non Patent Citation 1, the role of a providing apparatus that provides communication parameters to another wireless device and the role of a receiving apparatus that receives the communication parameters provided by the providing apparatus and sets the communication parameters in the receiving apparatus are necessary.

Therefore, when a wireless device is to receive provided communication parameters by performing automatic setting, the wireless device must find a providing apparatus that provides communication parameters. To search for a providing apparatus, a probe request and a probe response which are search signals for a wireless LAN can be used. In this case, a receiving apparatus sends a probe request as a search message, and detects a providing apparatus by receiving, as a response from the providing apparatus, a probe response including information indicating that the sender of the response is a providing apparatus.

In infra-communication, an apparatus that sends a response to a probe request is an access point. Therefore, when an access point operates as a providing apparatus, a receiving apparatus that receives provided communication parameters can easily detect the providing apparatus.

In contrast, in ad-hoc communication, it is defined that an apparatus that sends a response to a probe request is an apparatus that sent a beacon immediately before receiving the probe request. Therefore, for example, when another apparatus is participating in a network where a providing apparatus is participating, this other apparatus may respond to a probe request from a receiving apparatus. As a result, it may take a longtime for the receiving apparatus to detect the providing apparatus. Furthermore, the receiving apparatus may not be able to detect the providing apparatus before the time limit of a communication-parameter automatic setting process expires. In this case, no communication-parameter automatic setting may be performed.

[Patent Citation 1]
US Patent Application No. 2006/0268744 (corresponding to Japanese Patent Laid Open No. 2006-311139)
[Non Patent Citation 1]
Wi-Fi CERTIFIED™ for Wi-Fi Protected Setup: Easing the User Experience for Home and Small Office Wi-Fi® Networks, http://www.wi-fi.org/wp/wifi-protected-setup

DISCLOSURE OF INVENTION

The present invention provides techniques for enabling a receiving apparatus that receives provided communication parameters to easily and quickly detect a providing apparatus.

The present invention also provides techniques for enabling an apparatus to which power is supplied (lower device) to operate in a stable manner. Further features of the present invention will become apparent from the following description of exemplary embodiments with reference to the attached drawings.

The present invention provides a communication apparatus, including: a setting unit configured to perform a setting process of setting a communication parameter with another communication apparatus; a deciding unit configured to decide whether to provide, by the setting unit, the set communication parameter to a receiving apparatus that receives a provided communication parameter; and a change unit configured to change, when it is decided by the deciding unit to provide the set communication parameter, a parameter that controls sending of an informing signal in order to increase the number of informing signals sent by the communication apparatus per unit time.

BRIEF DESCRIPTION OF DRAWINGS

FIG. 5 is a flowchart illustrating an operation of the providing apparatus to perform a communication-parameter automatic setting process in the embodiment.
FIG. 6 is a flowchart illustrating an operation of the receiving apparatus to perform a communication-parameter automatic setting process in the embodiment.
FIG. 7 is a sequence diagram illustrating an operation of an apparatus A, an apparatus B, and an apparatus C in the embodiment.

DESCRIPTION OF EMBODIMENTS

A communication apparatus according to an embodiment of the present invention will now herein be described in detail with reference to the drawings. Although the following description concerns an example in which a wireless LAN system conforming to the IEEE 802.11 series is employed, the communication configuration is not necessarily limited to a wireless LAN conforming to IEEE 802.11.

An exemplary hardware configuration in the embodiment will be described.

Figure 1:
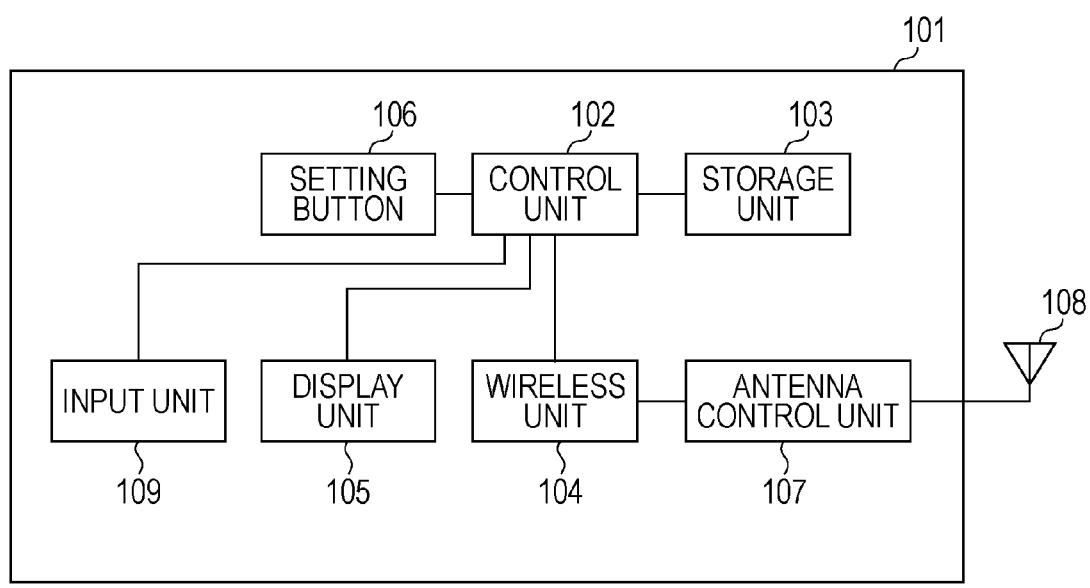
FIG. 1 is a block diagram of an apparatus.

FIG. 1 is a block diagram illustrating an exemplary structure of each apparatus, which will be described later. FIG. 1 illustrates the entirety of an apparatus 101. A control unit 102 controls the entire apparatus 101 by executing a control program stored in a storage unit 103. The control unit 102 additionally controls setting of communication parameters with another apparatus. The storage unit 103 stores the control program executed by the control unit 102 and various items of information, such as communication parameters. Various operations described later are performed by executing, with the control unit 102, the control program stored in the storage unit 103. The storage unit 103 stores communication parameters to be provided to another apparatus, and communication parameters received from another apparatus.

A wireless unit 104 performs wireless communication. A display unit 105 performs various displays. The display unit 105 has a function of outputting information in a visually recognizable manner, as in a liquid crystal display (LCD) or a light-emitting diode (LED), or a function of outputting sounds, as in a loudspeaker.

A setting button 106 is used for triggering or starting communication-parameter setting. Upon detection of an operation entered by a user using the setting button 106, the control unit 102 starts a communication-parameter automatic setting process, which will be described later. An antenna control unit 107 controls an antenna 108.

Figure 2:
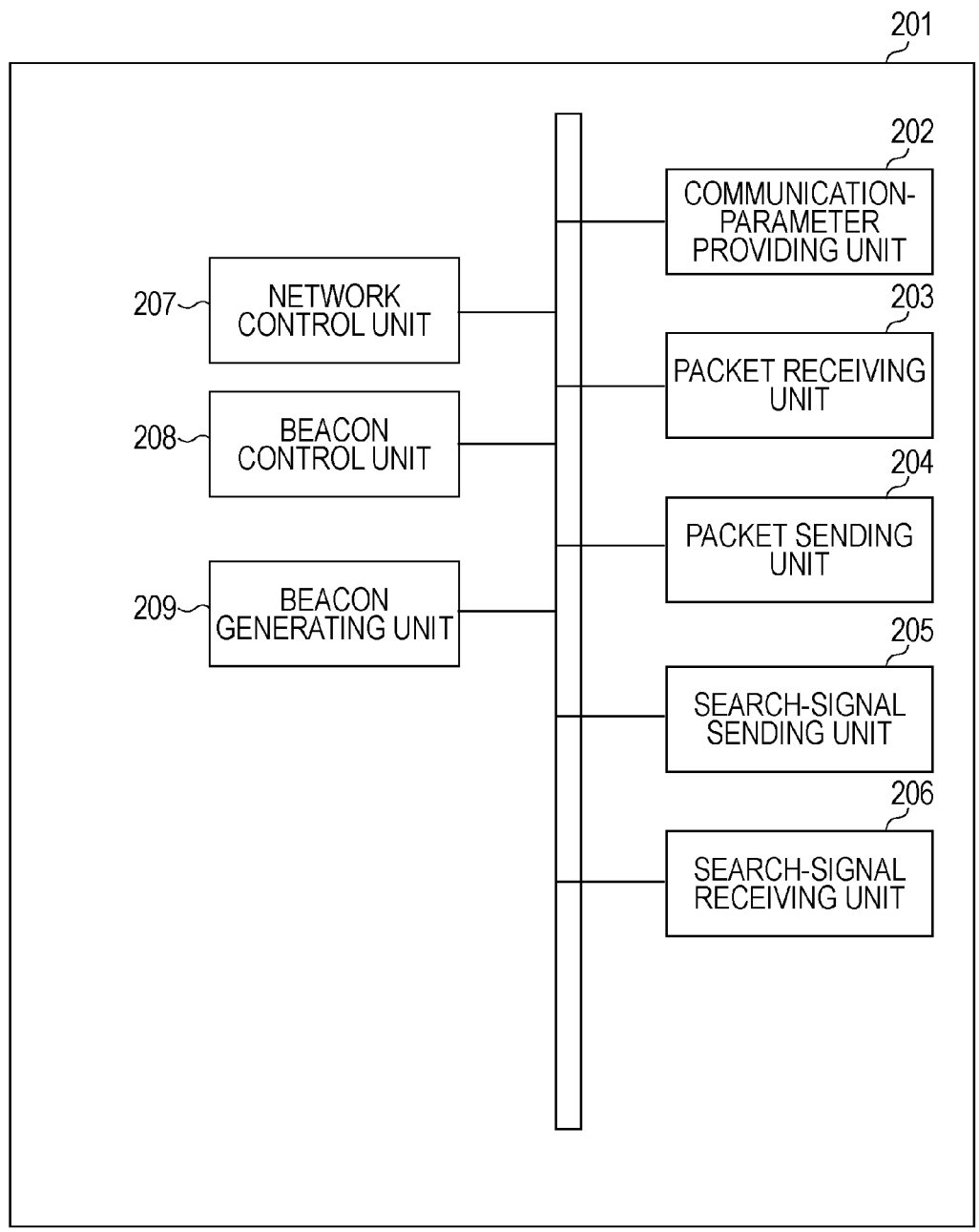
FIG. 2 is a software functional block diagram of the interior of a providing apparatus in an embodiment of the present invention.

FIG. 2 is a block diagram illustrating an exemplary configuration of software function blocks performed by an apparatus that provides communication parameters (hereinafter called a providing apparatus).

FIG. 2 illustrates the entirety of an apparatus 201. The apparatus 201 includes a communication-parameter providing unit 202 that performs a communication-parameter providing process.

In this embodiment, communication parameters needed to perform wireless communication, such as the SSID which is a network identifier, an encryption method, an encryption key, an authentication method, and an authentication key, are provided to another apparatus.

Also in this embodiment, when communication parameters are provided to another apparatus, the providing apparatus stores the provided communication parameters as the latest communication parameters that have been provided to a receiving apparatus (hereinafter called provided parameters) in the storage unit 103. In other words, the provided parameters stored in the storage unit 103 are communication parameters that have been last provided, among communication parameters that have already been provided by the providing apparatus.

A packet receiving unit 203 receives packets related to various communications. A packet sending unit 204 sends packets related to various communications.

A search-signal sending unit 205 controls sending of a device search signal, such as a probe request. A probe request may be a network search signal for searching a desired network. Sending of a probe request, which will be described later, is performed by the search-signal sending unit 205. Also, sending of a probe response, which is a response signal to a received probe request, is performed by the search-signal sending unit 205.

A search-signal receiving unit 206 controls receiving of a device search signal, such as a probe request, from another apparatus. Receiving of a probe request, which will be described later, is performed by the search-signal receiving unit 206. Also, receiving of a probe response is performed by the search-signal receiving unit 206. Various items of information (self-information) of the sending source device are added to a device search signal and a response signal in response thereto.

A network control unit 207 controls configuration of, participation in, and leaving from a network. Configuration of, participation in, and leaving from a wireless LAN network, which will be described later, are performed by the network control unit 207. In other words, configuration of a network is establishment or forming of a network. In ad-hoc communication, a network is configured by starting sending a beacon (informing signal).

A beacon control unit 208 controls sending of a beacon. A beacon sending algorithm in an IEEE wireless LAN ad-hoc network will be described.

In the ad-hoc network, beacons are sent in an autonomous distributed manner by all apparatuses participating in the network. A beacon sending interval (beacon period) is to be determined by the apparatus that first configured the ad-hoc network. In general, a beacon is sent from any of the apparatuses at an interval of about 100 ms.

A beacon sending timing is controlled by a parameter called a contention window (or a random number generation range; hereinafter abbreviated as "CW"). Each apparatus in the network obtains a random value (CWrand) from 0 to CW at the time of sending a beacon. A waiting time (back-off time) until sending a beacon is obtained by multiplying CWrand by a predetermined interval (slot time). The waiting time until sending a beacon is decremented by the slot time, and, when the waiting time becomes zero, a beacon is sent. If an apparatus receives a beacon from another apparatus before sending a beacon, the apparatus stops sending a beacon. In this way, contention of beacons sent from apparatuses can be avoided. Each apparatus in the ad-hoc network selects a random number from 0 to CW. Among apparatuses participating in the network, an apparatus that has selected the smallest CWrand sends a beacon.

For example, when the same CW, serving as an initial value, is set to all apparatuses, the probability of sending a beacon is the same for all apparatuses. As a result, the number of beacons sent per unit time is substantially the same for all apparatuses. In other words, the frequency of sending a beacon (sending rate) is the same for all apparatuses. In contrast, when one apparatus in the network sets its CW to a value less than the initial value, the probability of sending a beacon becomes higher for this apparatus than for any other apparatus, and accordingly, the number of beacons sent by this apparatus per unit time is increased. That is, CW is a parameter for determining the probability of sending a beacon or a parameter for determining the number of beacons sent per unit time. In other words, CW is a parameter for determining a beacon sending rate of each apparatus. That is, CW is a parameter for determining a beacon sending timing or a parameter for determining a waiting time until sending a beacon.

The value of CW is changeable within the range from CWmin (minimum value) to CWmax (maximum value). When CW is set to CWmin, the number of beacons sent per unit time is maximized. It is assumed that CWinit (>CWmin) is set as an initial value in each apparatus. The beacon control unit 208 controls sending of a beacon by changing the value of CW. A beacon generating unit 209 generates a beacon. A beacon generated by the beacon generating unit 209 is broadcast using the packet sending unit 204. Various items of information (self-information) of the sending source device are added to the beacon.

Figure 3:
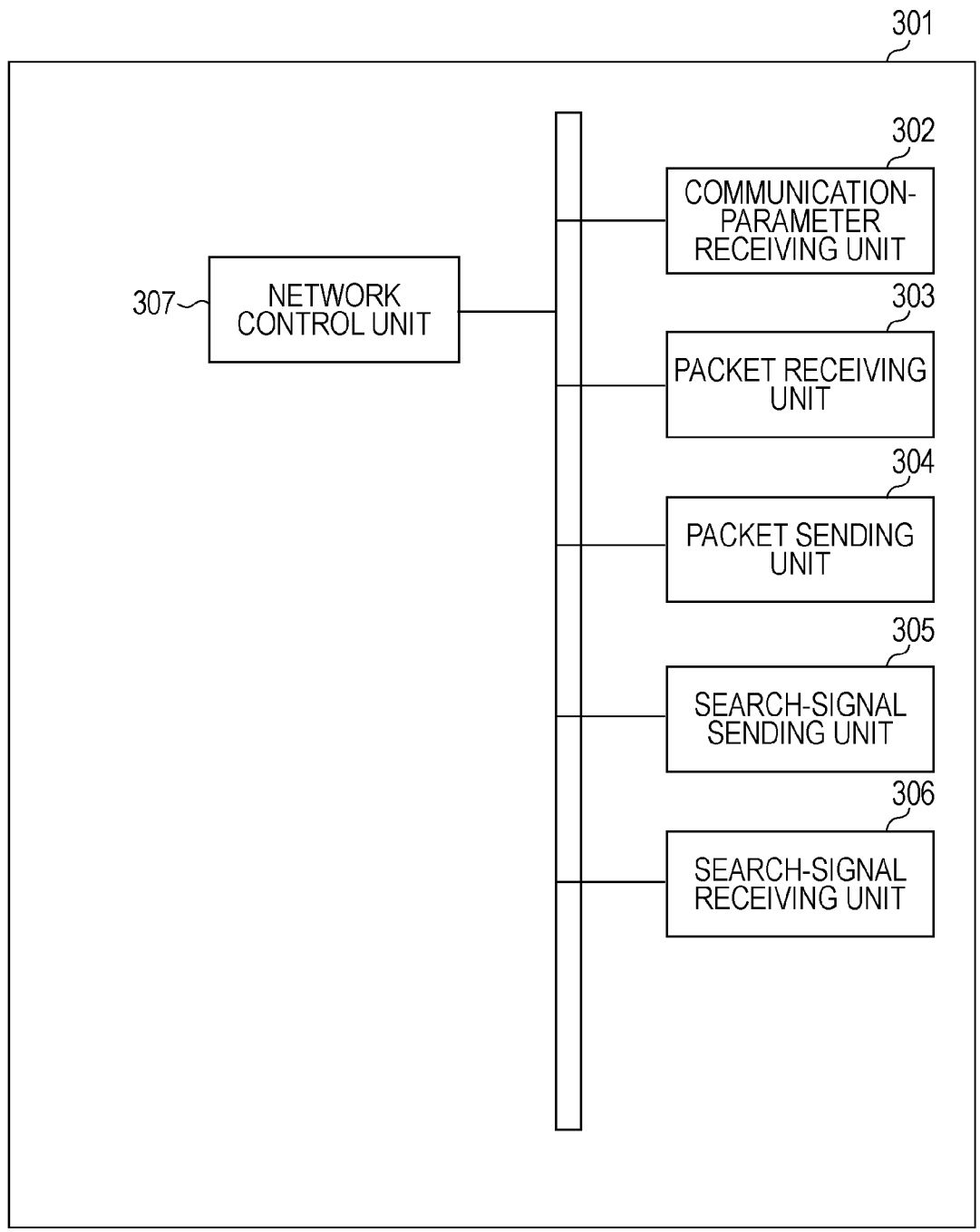
FIG. 3 is a software functional block diagram of the interior of a receiving apparatus in the embodiment of the present invention.

FIG. 3 is a block diagram illustrating an exemplary configuration of software function blocks performed by an apparatus that receives communication parameters (hereinafter called a receiving apparatus).

FIG. 3 illustrates the entirety of an apparatus 301. The apparatus 301 includes a communication-parameter receiving unit 302 that performs a communication-parameter receiving process. In this embodiment, communication parameters needed to perform wireless communication, such as the SSID which is a network identifier, an encryption method, an encryption key, an authentication method, and an authentication key, are received from a providing apparatus.

A packet receiving unit 303 receives packets related to various communications. A packet sending unit 304 sends packets related to various communications.

A search-signal sending unit 305 controls sending of a device search signal, such as a probe request. A search-signal receiving unit 306 controls receiving of a device search signal, such as a probe request, from another apparatus.

A network control unit 307 controls participation in and leaving from a network. Participation in and leaving from a network, which will be described later, are performed by the network control unit 307.

All software function blocks are correlated in terms of software or hardware. The foregoing function blocks are only exemplary. A plurality of function blocks may constitute one function block, or any of the function blocks may be divided into a plurality of blocks that perform a plurality of functions.

Figure 4:
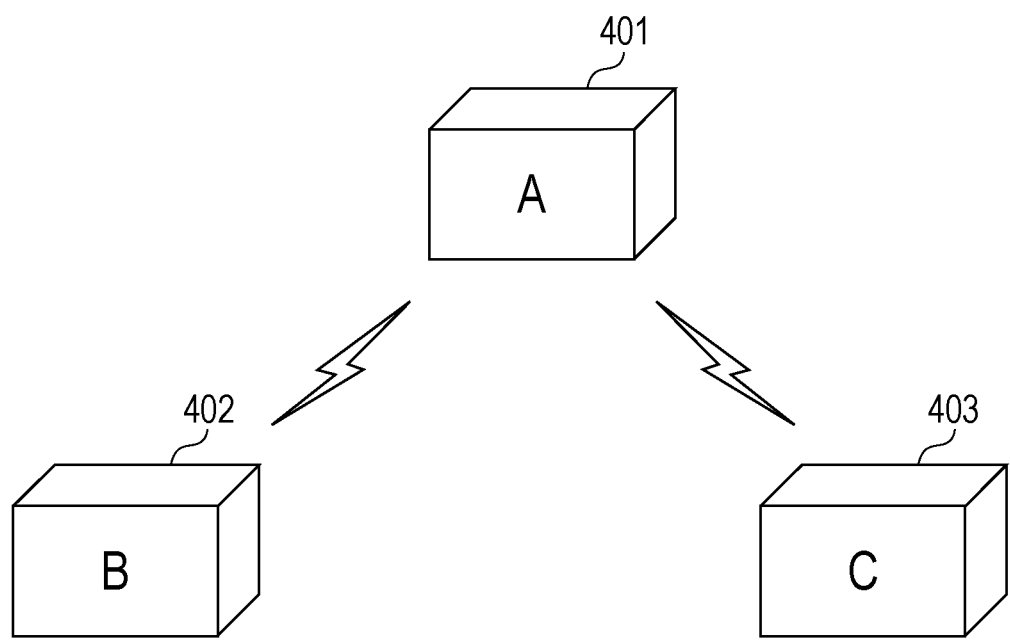
FIG. 4 is a network diagram in the embodiment of the present invention.

FIG. 4 is a diagram illustrating a communication apparatus A401 (hereinafter called an apparatus A), a communication apparatus B402 (hereinafter called an apparatus B), and a communication apparatus C403 (hereinafter called an apparatus C).

The apparatus A, the apparatus B, and the apparatus C have an IEEE 802.11 wireless LAN communication function and perform wireless communication by performing ad-hoc communication with one another.

The apparatus A is a providing apparatus and has the foregoing configurations illustrated in FIGS. 1 and 2. The apparatus B and the apparatus C are receiving apparatuses and have the foregoing configurations illustrated in FIGS. 1 and 3.

In this example, the apparatus A and the apparatus B first perform a communication-parameter automatic setting process in which the apparatus B participates in an ad-hoc network configured by the apparatus A. Then, the apparatus C, which wishes to participate in this network, performs a communication-parameter automatic setting process with the apparatus A. The apparatus A provides newly generated communication parameters to the apparatus B, and provides to the apparatus C the same communication parameters as those provided to the apparatus B.

FIG. 6 is an operation flowchart illustrating a process performed when the apparatus B and the apparatus C, which are receiving apparatuses, perform a communication-parameter automatic setting process. When the setting button 106 in each of the receiving apparatuses is operated by a user, the process illustrated in FIG. 6 is started. When the setting button 106 is operated, a timer for determining whether a time limit of a communication-parameter automatic setting process has reached is activated.

After the process is started, the search-signal sending unit 305 in the receiving apparatus sends a probe request (S601). Thereafter, the search-signal receiving unit 306 waits for a certain time for a probe response or a beacon, which includes additional information indicating communication-parameter automatic setting, to be sent from a providing apparatus (S602). A probe response or a beacon including additional information indicating communication-parameter automatic setting are signals sent from a providing apparatus during an automatic setting process. When an automatic setting process is not being performed, the providing apparatus sends a probe response or a beacon including no additional information indicating communication-parameter automatic setting.

When no signal including additional information is received within the certain time and when the time limit of the automatic setting process has not expired (NO in step S603), the flow returns to step S601, and sending of a probe request is repeated.

When no probe response or beacon including additional information is received before the time limit of the automatic setting process expires (YES in step S603), the process is terminated.

When a probe response or a beacon including additional information is received, the communication-parameter receiving unit 302 specifies, from the received signal, the identifier of a network configured by the providing apparatus. After the identifier has been specified, the network control unit 307 participates in the network, and the communication-parameter receiving unit 302 requests the providing apparatus to provide communication parameters. The receiving apparatus receives communication parameters from the providing apparatus and stores the communication parameters in the storage unit 103 (S604).

In step S602, the receiving apparatus waits for a probe response or a beacon including additional information indicating communication-parameter automatic setting to be sent from the providing apparatus. However, the receiving apparatus may wait for only one of a probe response and a beacon. When the receiving apparatus waits for a beacon, sending of a probe request in step S601 may be omitted.

In the IEEE 802.11 wireless LAN ad-hoc network, it is defined that an apparatus that sends a probe response is an apparatus that sent a beacon immediately before receiving a probe request. Therefore, in steps S601, if a providing apparatus sent no beacon immediately before receiving a probe request sent from the receiving apparatus, the providing apparatus sends no probe response including additional information indicating communication-parameter automatic setting. Therefore, when a plurality of apparatuses are participating in the network, even if there exists a providing apparatus that has started a communication-parameter automatic setting process, the receiving apparatus may not be able to receive a probe response from the providing apparatus before the time limit expires. As has been described above, each apparatus participating in the IEEE 802.11 wireless LAN ad-hoc network randomly sends a beacon. Therefore, when a plurality of apparatuses are participating in the network, even if there exists a providing apparatus that has started a communication-parameter automatic setting process, the receiving apparatus may not be able to receive a beacon from the providing apparatus before the time limit expires. When the receiving apparatus can receive a probe response or a beacon from the providing apparatus, it may take time for the receiving apparatus to receive such a signal. Accordingly, it may take a long time to complete reception of communication parameters. In FIG. 5 described later, a process performed by the providing apparatus to solve this problem is illustrated.

FIG. 5 is an operation flowchart illustrating a process performed when the apparatus A, which is a providing apparatus, performs a communication-parameter automatic setting process. When the setting button 106 is operated in the providing apparatus, the process illustrated in FIG. 5 is started. When the setting button 106 is operated, a timer for determining whether a time limit of a communication-parameter automatic setting process has reached is activated.

Firstly, the providing apparatus refers to the storage unit 103 and determines whether communication parameters to be provided to the receiving apparatus are provided parameters (S501). When communication parameters to be provided to the receiving apparatus are provided parameters, the flow proceeds to step S502.

In this embodiment, when provided parameters are stored in the storage unit 103, the provided parameters are provided to the receiving apparatus. In contrast, when no provided parameters are stored in the storage unit 103, newly generated communication parameters are provided to the receiving apparatus. In this case, it is determined in step S501 whether communication parameters to which information indicating that these communication parameters are provided parameters is added (hereinafter called provided information) are stored in the storage unit 103. A process of adding provided information to communication parameters is performed in step S510, which will be described later.

When communication parameters to be provided to the receiving apparatus are provided parameters, the beacon control unit 208 sets CW to a value that is less than the initial value (S502). In this case, CW may be set to a value that is one step less than the initial value, or CW may be set to CWmin, which is the minimum value.

When communication parameters to be provided to the receiving apparatus are not provided parameters, the beacon control unit 208 does not change CW from the initial value, and the flow proceeds to step S503.

Thereafter, the network control unit 207 configures a network using communication parameters to be provided to the receiving apparatus (S503). As has been described above, a network is configured by starting sending a beacon. When a network has already been configured, the processing in step S503 is omitted. In this embodiment, when the apparatus A is to provide communication parameters to the apparatus B, the apparatus A configures a network using newly generated communication parameters. When the apparatus A is to provide the communication parameters to the apparatus C, since the network has already been configured, the processing in step S503 is omitted.

Next, the beacon generating unit 209 generates a beacon including additional information indicating communication-parameter automatic setting, and starts broadcasting the beacon using the packet sending unit 204 (S504). In the above-described case, a network is configured in step S503, and then sending of a beacon including additional information indicating communication-parameter automatic setting is started in step S504. However, these two steps may be combined as one process. That is, a network may be configured by starting sending a beacon including additional information indicating communication-parameter automatic setting.

Thereafter, the providing apparatus waits for a radio signal to be sent from a surrounding apparatus (S505). When the time limit of the communication-parameter automatic setting process has expired before the providing apparatus receives a desired signal (YES in S506), the process is terminated. When the time limit of the automatic setting process has not expired (NO in S506), the flow returns to step S505, and the providing apparatus continues waiting for a radio signal.

When the providing apparatus receives a radio signal, the search-signal receiving unit 206 determines whether the received signal is a probe request (S507).

When it is determined in step S507 that the received signal is a probe request, the search-signal sending unit 205 determines whether the packet sending unit 204 sent a beacon immediately before receiving the probe request (S507-1). When the packet sending unit 204 sent a beacon immediately before receiving the probe request, the search-signal sending unit 205 sends a probe response including additional information indicating communication-parameter automatic setting (S512). After sending the probe response, the flow returns to step S505, and the providing apparatus again waits for a radio signal. When it is determined in step S507-1 that the providing apparatus sent no beacon immediately before receiving the probe request, the providing apparatus does not send a probe response, and the flow returns to step S505.

When it is determined in step S507 that the received signal is not a probe request, the communication-parameter providing unit 202 determines whether the received signal is a communication-parameter providing request (S508).

When the received signal is not a communication-parameter providing request, the flow returns to step S505, and the providing apparatus again waits for a radio signal.

When the received signal is a communication-parameter providing request, the communication-parameter providing unit 202 provides communication parameters to a receiving apparatus that has sent the providing request (S509).

After providing the communication parameters, the communication-parameter providing unit 202 adds provided information to the provided communication parameters and stores the communication parameters with the provided information in the storage unit 103 (S510).

The beacon control unit 208 sets CW to the initial value (S511). Furthermore, the beacon generating unit 209 deletes additional information indicating communication-parameter automatic setting from a beacon to be sent, and the process is terminated (s512).

As above, the providing apparatus determines whether communication parameters to be provided to the receiving apparatus are provided parameters. When communication parameters to be provided to the receiving apparatus are provided parameters, CW is set to a value less than the initial value, and sending of a beacon is started. When communication parameters are newly provided to a receiving apparatus, if the communication parameters have already been provided to another communication apparatus, this other communication apparatus may be participating in a network configured by the providing apparatus. Therefore, the providing apparatus sets CW to a value less than the initial value, thereby making the beacon sending frequency of the providing apparatus higher than that of the other communication apparatus participating in the network. As a result, the probability of the receiving apparatus receiving, from the providing apparatus, a probe response or a beacon including additional information indicating communication-parameter automatic setting becomes higher, and accordingly, the providing apparatus can be quickly detected. By setting CW to a value less than the initial value, the beacon sending frequency of the providing apparatus becomes higher than that of the other communication apparatus. As a result, the power consumption of the providing apparatus becomes larger. After the providing apparatus provides communication parameters, it becomes unnecessary for the providing apparatus to send more beacons than that sent by the other communication apparatus. Therefore, CW is reset to the initial value, thereby suppressing unnecessary power consumption.

In contrast, when communication parameters to be provided are not provided parameters, no communication apparatus other than the providing apparatus is participating in a network in which an apparatus can participate using the communication parameters. In this case, the providing apparatus is the only apparatus that sends a beacon in the network. Therefore, the receiving apparatus can substantially reliably receive a probe response or a beacon from the providing apparatus. Thus, the providing apparatus does not change CW, which means that unnecessary processing is omitted, and the processing load becomes smaller.

FIG. 7 is a sequence diagram illustrating the operation of each apparatus in the embodiment.

When the setting button 106 in each of the apparatus A and the apparatus B is operated by a user, the apparatus A starts the process illustrated in FIG. 5, and the apparatus B starts the process illustrated in FIG. 6. At this point, no provided parameters are stored in the storage unit 103. Thus, the apparatus A configures a network using newly generated communication parameters (F701). The apparatus A provides the generated communication parameters to the apparatus B (F702), and the apparatus B participates in the network (F703). The apparatus A stores the communication parameters provided to the apparatus B as provided parameters in the storage unit 103.

After the communication parameters are provided to the apparatus B, when the setting button 106 in the apparatus A is operated by the user, the apparatus A starts the process illustrated in FIG. 5. At this point, the provided parameters are stored in the storage unit 103. Thus, the apparatus A determines that communication parameters to be provided are the provided parameters (F704). The apparatus A sets CW to a value less than the initial value (F705), and starts sending a beacon including additional information indicating communication-parameter automatic setting. Since CW has been set to a value less than the initial value, the beacon sending frequency of the apparatus A is higher than that of the apparatus B.

When the setting button 106 in the apparatus C is operated by a user, the apparatus C starts the process illustrated in FIG. 6. The apparatus A provides, to the apparatus C, the same communication parameters as those provided to the apparatus B (S706). Upon receipt of the communication parameters, the apparatus C participates in the network using the communication parameters (S707). After the communication parameters are provided, the apparatus A resets CW to the initial value (F708).

As above, when communication parameters that have already been provided to the apparatus B are to be newly provided to the apparatus C, it is highly likely that the apparatus B is already participating in a network configured by the apparatus A. In consideration of this, the beacon sending frequency of the apparatus A is made higher than that of the apparatus B by setting CW of the apparatus A to a small value. As a result, the probability of the apparatus C, which is a communication-parameter receiving apparatus, detecting the apparatus A, which is a providing apparatus, in a short period of time becomes higher. As a result, the probability of the receiving apparatus C not detecting the providing apparatus A before the time limit of a communication-parameter setting process expires can be reduced. When the providing apparatus can be detected in a short period of time, the time until completion of receiving communication parameters, and the time until data communication is made possible by participating in the network, can be reduced. Therefore, usability is improved. Furthermore, when the providing apparatus provides communication parameters, CW is reset to the initial value, and accordingly, the beacon sending frequency of the providing apparatus becomes equivalent to that of another apparatus in the network. As a result, unnecessary power consumption can be suppressed.

Although the foregoing description concerns, in order to simplify the description, the case where there is only one apparatus (apparatus B) to which the apparatus A has provided communication parameters, the advantages are greater when there are more apparatuses to which the apparatus A has provided the same communication parameters. That is, the greater the number of receiving apparatuses to which the same communication parameters have been provided, the greater the number of apparatuses participating in a network configured by the providing apparatus and sending beacons. As a result, it may take along time for a receiving apparatus that wishes to newly participate in the network to detect the providing apparatus, and the probability of this receiving apparatus not detecting the providing apparatus before the time limit of a communication-parameter automatic setting process expires becomes higher. The number of receiving apparatuses to which the same communication parameters have been provided may be stored, and the value of CW may be changed in accordance with this number. That is, as the number of apparatuses to which the communication parameters have been provided becomes greater, the value of CW may be set to a smaller value. Accordingly, even when the number of apparatuses participating in the same network increases, the beacon sending frequency of the providing apparatus becomes higher. Therefore, the probability of the receiving apparatus detecting the providing apparatus in a short period of time becomes higher.

The exemplary embodiment disclosed herein is for illustrative purposes only, and the scope of the present invention is not limited to this embodiment. Various modifications can be made to the embodiment without departing from the gist of the present invention.

For example, in the description of the foregoing embodiment, a probe request and a probe response are used as search signals. However, this is not to limit signals to be sent. Any signals may be used as long as they can play similar roles.

In the foregoing embodiment, it has been described that, when it is determined in step S501 that provided parameters are stored in the storage unit 103, the provided parameters are provided to the receiving apparatus. However, the processing need not necessarily be performed in this way. When provided parameters are stored, a screen for allowing the user to select whether to provide the provided parameters may be displayed on the display unit 105, and, in accordance with the user's selection, the determination in step S501 may be performed.

In the foregoing embodiment, it has been described that, if no provided parameters are stored, newly generated communication parameters are provided. However, communication parameters need not necessarily be newly generated. For example, default communication parameters may be prepared and provided.

In the foregoing embodiment, it has been described that the same CW, serving as an initial value, is set to all apparatuses. However, different CWs may be set to different apparatuses. When provided parameters are to be provided, CW may be set to the minimum value. In this way, the beacon sending frequency can be made more reliably higher than that of another apparatus.

In the foregoing embodiments, examples in which the value of CW is changed in order to make the number of beacons sent by the providing apparatus per unit time greater than that of other apparatuses have been described. However, other parameters may be used as long as the number of beacons sent by the providing apparatus per unit time can be made greater. For example, when the beacon sending interval (beacon period) is changeable, the number of beacons sent per unit time can be increased by reducing the beacon period in the providing apparatus. In this case, the beacon period is reduced when it is determined that provided parameters are to be provided, whereby the probability of the receiving apparatus detecting the providing apparatus in a shorter period of time becomes higher.

In the foregoing embodiment, it has been described that CW is reset to the initial value after communication parameters are provided to the receiving apparatus. However, CW may be reset to the initial value when it is determined that the receiving apparatus has detected the providing apparatus. For example, when the providing apparatus receives a communication-parameter providing request from the receiving apparatus, it can be determined that the receiving apparatus has detected the providing apparatus. Alternatively, when the providing apparatus sends a probe response to the received probe request, it can be determined that the receiving apparatus has detected the providing apparatus.

In the foregoing description, it has been described that the roles of a providing apparatus and a receiving apparatus are fixed. However, the roles may be changed in accordance with circumstances. For example, after the receiving apparatus receives communication parameters provided by the providing apparatus, the receiving apparatus may serve as a providing apparatus and provide communication parameters to a new apparatus that wishes to participate in the network. In this case, it is determined whether the provided communication parameters are to be provided to the new apparatus wishing to participate in the network. When it is determined to provide the provided communication parameters, CW is set to a value less than the initial value.

In other words, in the embodiment, it is determined whether to provide, to a receiving apparatus that receives provided communication parameters, communication parameters that have been set by a communication-parameter setting process performed with another communication apparatus. When it is determined to provide the set communication parameters, a parameter that controls sending of a beacon is changed in order to increase the number of beacons sent per unit time.

The description of the foregoing embodiment concerns the case where the wireless LAN conforming to IEEE 802.11 is used by way of example. However, the present invention is applicable to other wireless media such as a wireless universal serial bus (USB), MultiBand Orthogonal frequency-division multiplexing (OFDM) Alliance (MBOA), Bluetooth (registered trademark), ultra-wideband (UWB), and Zigbee. Also, the present invention is applicable to wired communication media such as power line communications (PLC) or a wired LAN.

UWB includes a wireless USB, wireless 1394, WiNET, and the like.

Although the network identifier, the encryption method, the encryption key, the authentication method, and the authentication key serve as communication parameters in the description of the foregoing embodiment, other information may serve as communication parameters. That is, communication parameters include other information.

According to the present invention, a storage medium having recorded thereon a program code of software that realizes the foregoing functions is supplied to a system or apparatus, and a computer (central processing unit (CPU) or microprocessing unit (MPU)) of the system or apparatus reads and executes the program code stored on the storage medium. In this case, the program code itself read from the storage medium realizes the foregoing functions of the embodiment, and the storage medium having the program code recorded thereon constitutes the present invention.

As the storage medium for providing the program code, for example, a flexible disk, a hard disk, an optical disc, a magneto-optical disc, a compact disc read-only memory (CD-ROM), a compact disc-recordable (CD-R), a magnetic tape, a non-volatile memory card, a ROM, a digital versatile disc (DVD), or the like can be used.

As well as realizing the foregoing functions by executing the program code read by the computer, an operating system (OS) running on the computer may execute part of or the entirety of actual processing on the basis of instructions of the program code to realize the foregoing functions.

Furthermore, the program code read from the storage medium may be written into a memory included in a function expansion board placed in the computer or a function expansion unit connected to the computer. On the basis of the instructions of the program code, a CPU included in the function expansion board or the function expansion unit may execute part of or the entirety of actual processing to realize the foregoing functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-113901, filed Apr. 24, 2008, which is hereby incorporated by reference herein in its entirety.

The invention claimed is:

1. A communication apparatus comprising a control unit that:
    decides whether a communication parameter to be provided to a first receiving apparatus is a communication parameter that has been provided to a second receiving apparatus; and
    changes, when it is decided that the communication parameter to be provided to the first receiving apparatus is the communication parameter that has been provided to the second receiving apparatus, a control parameter that controls sending of an informing signal in order to increase the number of informing signals sent by the communication apparatus per unit time.

2. The communication apparatus according to claim 1, further comprising a storage unit that stores the communication parameter, wherein, when the communication parameter is stored in the storage unit, the control unit decides to provide the communication parameter.

3. The communication apparatus according to claim 1, wherein the communication parameter is the last provided communication parameter among communication parameters that have been provided by the communication apparatus.

4. The communication apparatus according to claim 1, further comprising network control unit that configures a network using a communication parameter to be provided to the second receiving apparatus when it is decided by the control unit not to provide the communication parameter.

5. The communication apparatus according to claim 1, wherein the control unit resets the control parameter to a value that existed before the change performed by the control unit when the communication parameter has been provided to the second receiving apparatus.

6. The communication apparatus according to claim 1, wherein the control unit:

determines whether the second receiving apparatus has detected the communication apparatus, and resets the control parameter to a value that existed before the change performed by the control unit when the control unit determines that the second receiving apparatus has detected the communication apparatus.

7. The communication apparatus according to claim 1, wherein the control unit decides whether to provide, to the second receiving apparatus, a communication parameter that has been provided by the communication apparatus to the first receiving apparatus.

8. The communication apparatus according to claim 1, wherein the control unit decides whether to provide, to the second receiving apparatus, a communication parameter that has been received by the communication apparatus from the first receiving apparatus.

9. The communication apparatus according to claim 1, wherein the control parameter to be changed by the control unit is a parameter for determining a timing to send an informing signal.

10. The communication apparatus according to claim 1, wherein the control parameter to be changed by the control unit is a parameter for determining a waiting time until sending an informing signal from the communication apparatus.

11. A control method for a communication apparatus, the control method comprising:

deciding whether a communication parameter to be provided to a first receiving apparatus is a communication parameter that has been provided to a second receiving apparatus; and changing, when it is decided that the communication parameter to be provided to the first receiving apparatus is the communication parameter that has been provided to the second receiving apparatus, a control parameter that controls sending of an informing signal in order to increase the number of informing signals sent by the communication apparatus per unit time.

12. A computer-readable storage medium storing a computer-executable program of instructions for causing a computer to perform a control method for a communication apparatus, the control method comprising:

deciding whether a communication parameter to be provided to a first receiving apparatus is a communication parameter that has been provided to a second receiving apparatus; and changing, when it is decided that the communication parameter to be provided to the first receiving apparatus is the communication parameter that has been provided to the second receiving apparatus, a control parameter that controls sending of an informing signal in order to increase the number of informing signals sent by the communication apparatus per unit time.

* * * * *